Jan. 30, 1968　　　H. RUTHERFORD ET AL　　　3,365,994
BEARING BLOCK
Filed Dec. 16, 1966　　　　　　　　　　　　　2 Sheets-Sheet 2

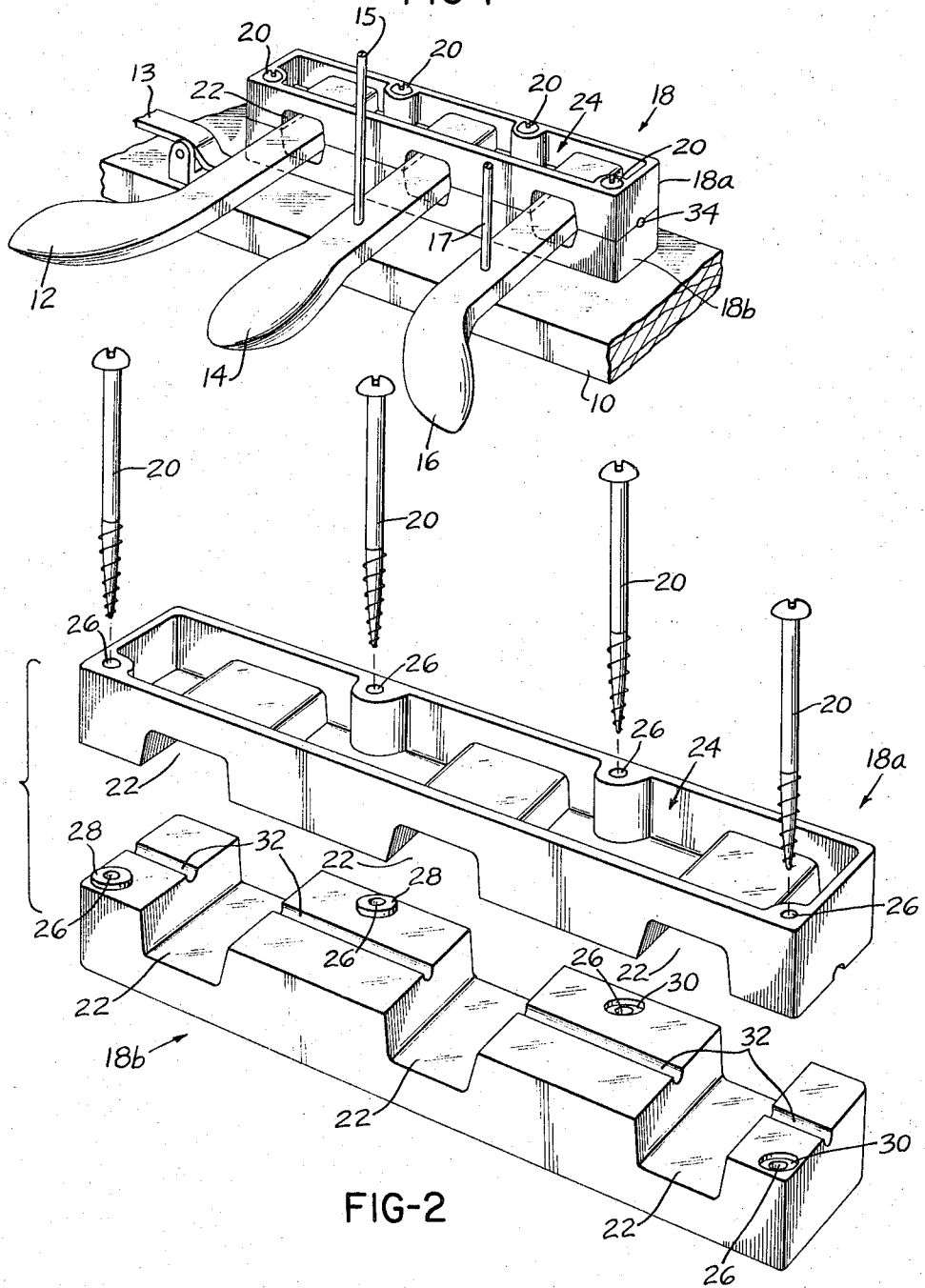

INVENTOR.
HALBERT RUTHERFORD
DANNY W. WEHR

United States Patent Office 3,365,994
Patented Jan. 30, 1968

3,365,994
BEARING BLOCK
Halbert Rutherford, Jasper, and Danny W. Wehr, Dale, Ind., assignors to Kimball Piano & Organ Co., Jasper, Ind., a corporation of Indiana
Filed Dec. 16, 1966, Ser. No. 602,297
2 Claims. (Cl. 84—228)

ABSTRACT OF THE DISCLOSURE

A piano pedal bearing block comprising two plastic members of identical molded construction.

---

This invention relates to a bearing block structure and is particularly concerned with a bearing block structure for supporting the pedals of a piano or the like.

Bearing blocks, or pivot blocks, for pivotally supporting the pedals of pianos and the like are known and heretofore have been made of wood. Wood bearing blocks have proved to provide adequate support and the pedal pivot shafts but are relatively expensive, and are somewhat sensitive to humidity.

The present invention proposes to provide a bearing block structure of the nature referred to, which is not only less expensive than the known wood bearing blocks, but also embodies other advantages which have not heretofore been realized in connection with wood blocks, or which cannot be realized when wood is the material of the block.

More specifically, the present invention proposes to form the bearing blocks out of a plastic material; a medium to high impact polystyrene, for example; and, furthermore, to make the bearing block of a pair of identical block members which assemble to form the bearing block. The block members are molded and are light, but strong, and are so formed that they interlock when assembled in aligned relation. Clamping of the block members together in aligned assembled relation and clamping of the assembled bearing block to a support member in the piano frame is accomplished by one and the same screws, thereby effecting economy of materials and labor in connection with the assembly.

Since the block members are identical, the cost of manufacture thereof, and the inventory thereof that must be carried ahead of an assembly station, is reduced, and the further particular advantage is had that the bearing block as a whole is symmetrical about all central planes thereof and thus cannot be placed on the support member therefor in an improper position. This feature represents a further economy which is realized at the time of assembling the block members in position in a piano frame.

The exact nature of the present invention and the advantages thereof will be more fully comprehended upon reference to the following detailed specification, taken with the accompanying drawings, in which:

FIGURE 1 is a perspective view showing a bearing block according to the present invention assembled in a piano frame, together with the pedals supported thereby;

FIGURE 2 is a perspective view showing the bearing block with its two block members spaced apart;

Figure 3:
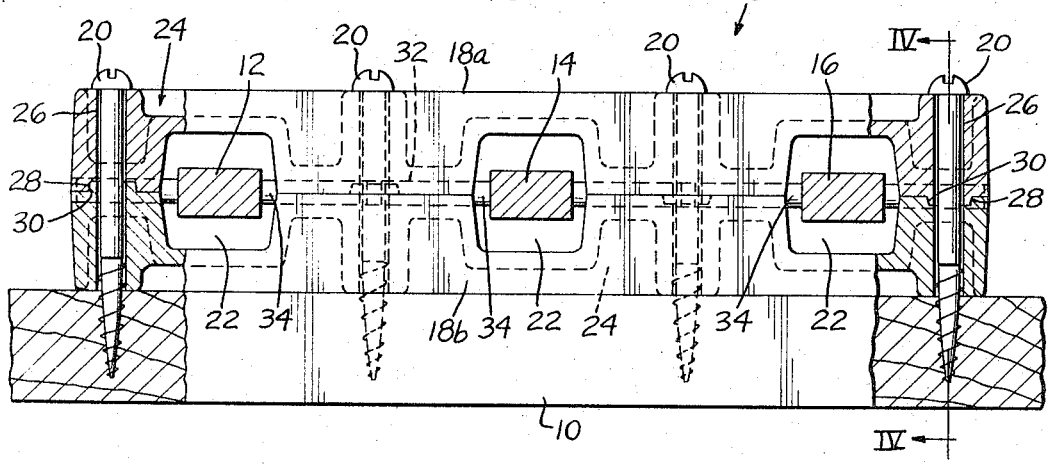
FIGURE 3 is a front view of the assembled block and pedals and the support member of the piano on which the block is mounted, partly broken away to show details.
Figure 4:
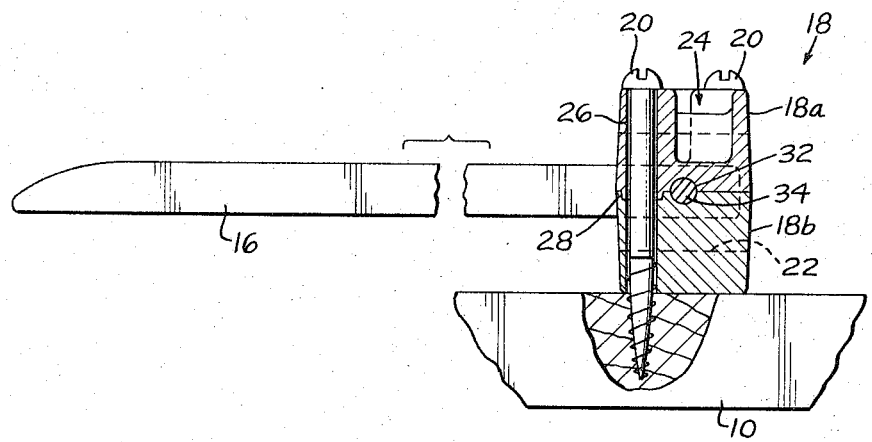
FIGURE 4 is a section on line IV—IV of FIGURE 3.

Referring to the drawings, more in detail, 10 represents a lower front rail of a piano frame. The piano pedals, of which there may be two or three, are indicated at 12, 14 and 16. The pedals are pivotally or tiltably supported in a bearing or pivot block, generally indicated at 18, which is fastened to frame member 10 by screws 20.

The block has holes extending therethrough from front to back through which the pedals 12, 14 and 16 extend. The pedals are tiltable in the block to actuate lever 13 and rods 15 and 17 which are connected to the dampers and hammer stop in a well known manner.

As will be seen in the drawings, the bearing block 18 is made up of two block members 18a and 18b which, in accordance with the invention, are identical in shape. Each block member is a molded plastic and has notches 22 extending thereacross from front to back on one side. When the block members are assembled, the notches in one block member register with those in the other block member and form the holes through which the pedals extend.

Each block member has a cavity 24 in the side opposite the notched side so the wall thickness of the block member is more or less uniform at every point. This makes for better molding conditions and makes the block members as light and economical as possible. The shape of the block members, with the peripheral flange, however, makes it extremely strong for its purpose.

A particular feature of the present invention is to be found in the provision of the raised boss regions 28 which are received in the sockets 30 when the block members are assembled. This keying arrangement accurately locates the block members relative to each other when assembled and prevents lateral shifting of the individual block members. The holes 26 for screws 20 preferably pass axially through the bosses and sockets. It will be apparent that the screws assist in holding the block members in alignment while the screws are being drawn up and that, when the screws are tightened, they will hold the block members in assembled relation and will also clamp the assembled block members fixedly in place on the support member provided therefor in the piano frame.

As will be seen in the drawing, each block member has a central half round recess 32 therein extending lengthwise of the block member. When the block members are assembled, these recesses are in register and provide a round base to receive the shaft or shafts 34 which are usually fixed to the pedals to provide tiltable support therefor. The plastic material of the block members makes a good bearing for the pedal support shaft so the pedals will tilt freely in the bearing block and without sticking or squeaking.

If desired, washers can be placed on the pedal shafts at the sides of the pedals to keep them centralized in the holes in the bearing block.

It will be understood that this invention is susceptible to modification in order to adapt it to different usages and conditions and, accordingly, it is desired to comprehend such modifications within this invention as may fall within the scope of the appended claims.

We claim:

1. A two-piece bearing block adapted to be mounted on the lower front rail of a piano frame to provide aligned bearings for the pivots of the piano pedals, said bearing block consisting of two plastic members of identical molded construction, each member having on one side a series of axially aligned semi-cylindrical recesses to provide bearings for the pedal pivots when the members are superimposed in face-to-face relation, each member being also provided on the same side with a plurality of parallel notches extending transversely across the axial line of the recesses to provide the block with transverse holes through it to receive the piano pedals when the two members are assembled, each member also having a plurality of holes through it which will register with the holes of the other member to receive screws for fastening the block to the rail.

2. The bearing block of claim 1, each member of which has a raised boss surrounding a screw hole in one half of the block and a circular recess around a symmetrically located screw hole in the other half of the block so that when the two block members are assembled, the boss will be seated in the recess.

References Cited

UNITED STATES PATENTS

| | | | |
|---|---|---|---|
| 690,362 | 12/1901 | Dayfoot et al. | 84—228 |
| 763,680 | 6/1904 | Larsen | 84—228 |

RICHARD B. WILKINSON, *Primary Examiner.*

C. OVERBEY, *Assistant Examiner.*